US006496346B1

(12) United States Patent
Bruckner

(10) Patent No.: US 6,496,346 B1
(45) Date of Patent: Dec. 17, 2002

(54) AUTOMATIC SYSTEM SHUTDOWN FOLLOWING PROCESSOR THERMAL CONDITION

(75) Inventor: Robert O. Bruckner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/579,767

(22) Filed: May 26, 2000

(51) Int. Cl.[7] ................................................. H02H 5/04
(52) U.S. Cl. ........................ 361/103; 307/97; 307/117; 323/907
(58) Field of Search ................................ 361/103, 717, 361/718; 323/907; 340/588, 654; 713/323, 324; 327/512, 378, 513; 307/97, 117

(56) References Cited

U.S. PATENT DOCUMENTS 6,172,611 B1 * 1/2001 Hussain et al. ............. 340/584

* cited by examiner

Primary Examiner—Ronald W. Leja
(74) Attorney, Agent, or Firm—Trop, Pruner & Hu, P.C.

(57) ABSTRACT

Power to a processor-based system is automatically disabled following a thermal condition detected by the processor. A predetermined thermal condition identified by the processor is coupled to a circuit that causes the power supply to be turned off. The response is substantially simultaneous to the predetermined thermal condition such that the processor and other integrated circuits located on the motherboard of the system may survive the thermal condition.

10 Claims, 2 Drawing Sheets

AUTOMATIC SYSTEM SHUTDOWN FOLLOWING PROCESSOR THERMAL CONDITION

BACKGROUND

This invention relates to thermal conditions in computer systems and, more particularly, to addressing critical thermal conditions.

A processor-based system includes a system board, sometimes known as a motherboard, populated with a great many integrated circuits, or ICs. These ICs operate by receiving power, at which time they may each independently generate a number of signals. Accordingly, a processor-based system's motherboard is generally connected to a central power supply.

For very large-scale integrated circuits, such as processors, a huge number of operations may be performed. Likewise, as clock speeds increase, the operations are performed at very fast rates. Accordingly, the processor may build up a tremendous amount of heat, which may degrade its performance. The distribution of power, and thus the control of the temperature of the processor is a paramount consideration for the motherboard designer.

As processors are built on smaller chips and run at faster clock rates, protecting the processor from over-heating remains a critical design consideration. The complexity and capability that once only mainframes could provide is today available on system boards that may fit in a shirt pocket. Technologies such as laptop computers, cellular telephones, personal digital assistants, digital cameras, and so on, contribute to this ever-greater demand for smaller system boards.

One mechanism for controlling the temperature of a processor on a motherboard is to attach a cooling fan to the motherboard. Another solution is to add a "heat sink" to the processor. The heat sink helps to dissipate heat from the processor during operation.

Despite these prophylactics, the processor on the motherboard may exceed a desired temperature. Once this threshold has been surpassed, the processor may fail or degrade in performance. Likewise, other ICs as well as non-ICs, such as hard disk drives, may suffer in performance if operated beyond certain temperature thresholds.

Some processor-based systems include firmware, operating systems, or other application software which monitors temperature conditions. These intelligent systems may address the temperature condition in any of a number of ways. For example, according to the Advanced Configuration and Power Interface specification (ACPI), an operating system monitors and responds to temperature conditions. The ACPI Specification, Revision 1.0, was published by Intel, Microsoft, and Toshiba, in December of 1996.

According to the ACPI specification, in response to a first temperature condition, the operating system may slow down operation of the processor clock, known as clock throttling. Upon receiving a next, ostensibly higher, temperature condition, the operating system may turn on a fan connected to the motherboard, and then may subsequently turn off one or more of the operating devices.

At a third temperature condition, known as a critical temperature point, the operating system performs an orderly shutdown of the system and finally disables power to the system. During orderly shutdown, the operating system may render motherboard circuitry and peripheral devices to a known state and may close any running software programs.

The above hardware and software solutions may address the majority of temperature conditions for a processor-based system. However, increasingly, processor-based systems may be subjected to environments in which temperatures may not be anticipated by system designers. In particular, highly mobile devices, such as cellular telephones, may be operated wherever people are found. In some temperature environments, the success or failure in saving an integrated circuit may turn on the speed at which the temperature condition is addressed.

Thus, there is a continuing need to more effectively address critical temperature conditions in processor-based systems.

DETAILED DESCRIPTION

Figure 1:
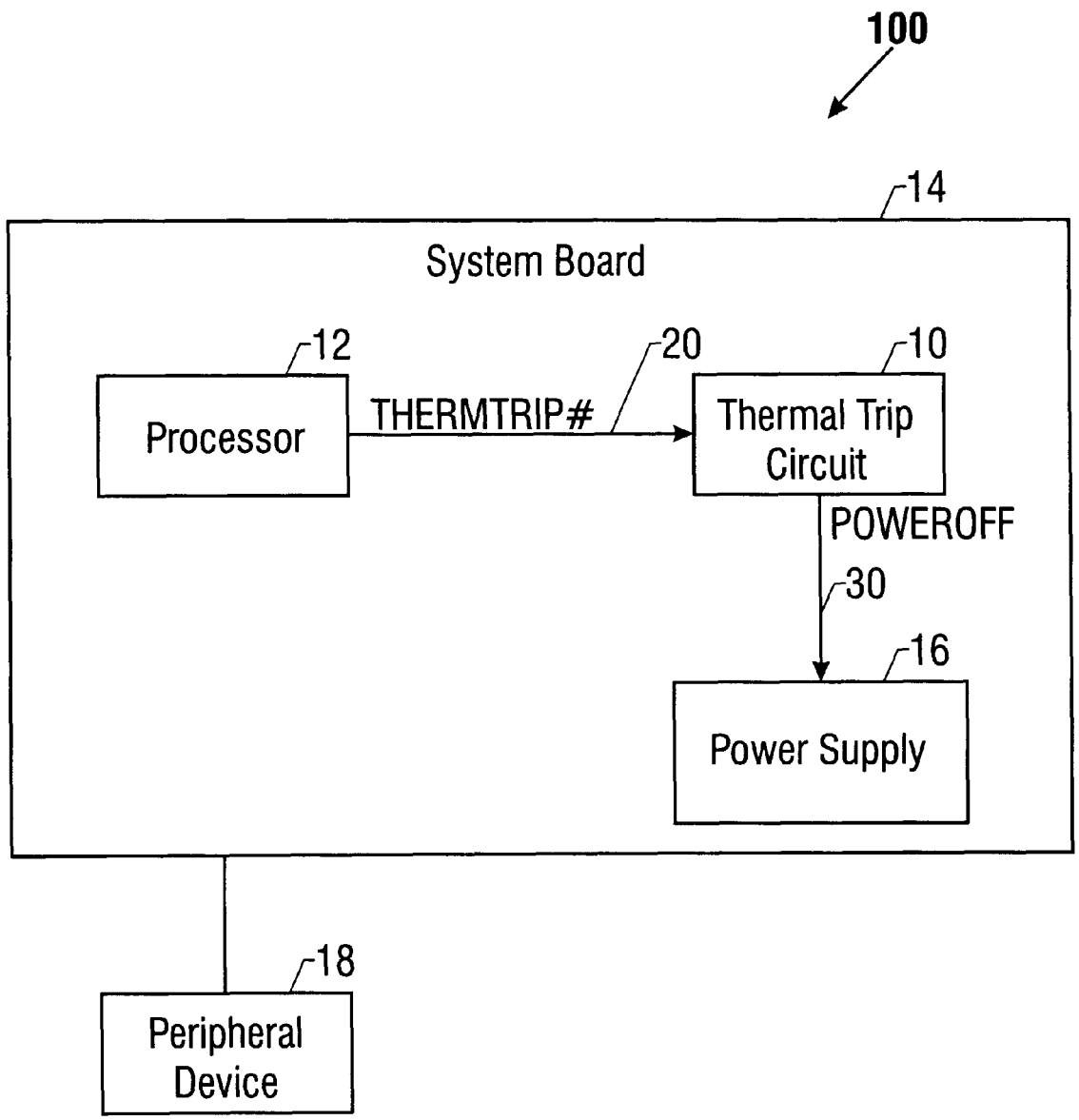
FIG. 1 is a block diagram of a system board according to one embodiment of the invention.

In prior art systems, an operating system program loaded on the processor-based system may respond to critical and non-critical thermal conditions of the processor in a hierarchical fashion. For example, in some operating systems, such as those written according to the ACPI specification, three distinct temperature conditions of the processor are monitored. When the processor reaches any of these temperature conditions, a response by the operating system may be provoked.

The operating system may, for example, poll or be interrupted by a routine that monitors one or more temperature sensors located somewhere on the motherboard of the processor-based system. The temperature sensors may indicate a temperature of the processor or of another integrated circuit located upon the motherboard. For example, an integrated circuit known to produce temperature conditions which may impact other circuits of the motherboard may be monitored. As described, below, in some prior art systems, the processor itself may monitor and indicate certain temperature conditions.

Table 1 shows three distinct predetermined temperatures and associated operating system responses, which have been implemented in some prior art systems. Each temperature indicates a processor temperature, although the temperature of other non-processor ICs may be responded to in a similar fashion.

TABLE 1

| OPERATING SYSTEM RESPONSE TO THERMAL CONDITION | |
|---|---|
| Temperature 1 | slow down processor clock |
| Temperature 2 | turn on fan; turn off peripheral device(s) |
| Temperature 3 | orderly shutdown of system; disable power |

For example, a first temperature, Temperature1 may be a predetermined, non-critical temperature condition, the occurrence of which causes the operating system to slow down the processor clock. When the processor clock is slowed down, the processor itself executes instructions at a slower rate. Ostensibly, the slower clock rate may cause the temperature of the processor and other motherboard components to drop.

A second temperature in Table 1, Temperature2, may also be a predetermined temperature, the occurrence of which results in slightly more aggressive measures by the operating system. Thus, temperature2 is expected to be a higher temperature than temperatures.

The measures taken by the operating system in response to temperature2 may vary. For example, in some processor-based systems, the operating system may turn on a fan or other cooling device connected to the system board. Once the fan cools the circuits on the system board, the temperature may drop below temperature2.

Another prophylactic that may be used by the operating system is to turn off one or more peripheral devices connected to the system board. For example, a non-volatile storage device, such as a hard disk drive, may be coupled to the system board. Controller circuitry for the hard disk drive may reside on the system board, or may be located on the drive itself. In either configuration, the hard disk drive and its controller circuitry may receive power from a power supply connected to the system board. The operation of the hard disk drive may thus contribute to an overall temperature increase of the system board. By turning off the non-volatile storage device, the temperature condition of the system board may thus be resolved.

Other devices as well may be disabled in response to excessive temperature conditions. Examples include a coprocessor, a modem, and a display monitor, to name a few. Further, in some prior art systems, the fan may be turned on, or a device may be turned off in response to the first, rather than the second, temperature condition.

A variety of implementations are possible for addressing temperature conditions of a processor-based system. In the examples above, the operating system monitors and reacts to temperature conditions. In other systems, firmware, such as a program stored in read-only memory, and executable upon powering the system on, may periodically monitor temperature conditions or be interrupted by the operating system or other software to react to temperature conditions.

Looking back to Table 1, a third predetermined temperature condition, Temperature3, may trigger the operating system to perform an orderly shutdown of both the hardware and the software of the system. For example, the operating system may systematically place each hardware device in a known state, such as an initial state. Additionally, the operating system may close software programs which are loaded or operating. Following the orderly shutdown; power to the system may be disabled, in some prior art systems. This implementation is described in the ACPI specification.

In some processors, upon determining that the internal temperature of the processor has exceeded a critical threshold value, the processor stops executing instructions. In this context, a critical temperature is a temperature beyond which the processor is known to operate in an unpredictable manner. The performance of the processor at this critical temperature is thus degraded. Further, in response to the critical temperature, a signal may then be sent, by the processor, to the rest of the motherboard, to identify the condition. For example, in the Pentium® processor, a THERMTRIP# signal is issued when a critical threshold temperature is exceeded, as determined by the processor itself.

If the Temperature3 value is based upon a critical temperature condition identified by the processor, such as the THERMTRIP# signal, the orderly shutdown of the system by the operating system may not be initiated. Because the processor stops executing instructions prior to issuing the THERMTRIP# signal, the operating system may not perform an orderly shutdown of the hardware and the software.

Instead, the system may be left in a "locked" or "hung" condition, during which the temperature of the processor may be unpredictable. Where the temperature condition that caused the processor to send the THERMTRIP# signal continues to exist, the temperature may continue to increase. The destruction of the processor and other integrated circuits on the motherboard may also continue to increase.

Thus, according to one embodiment, a processor-based system is automatically disabled of power to both the motherboard and the processor during a critical thermal event, as identified by the processor. The substantially instantaneous response to the critical thermal event may save the processor as well as other ICs on the motherboard from further degradation and/or destruction.

In FIG. 1, a processor-based system 100 includes a system board 14, such as a motherboard, according to one embodiment. The system board 14 includes a processor 12, and a power supply 16, as may be found in a typical processor-based system. In this context, the term "processor" may generally refer to one or more microprocessors, such as a microcontroller, an X86 microprocessor, a Pentium® processor, a digital signal processor, as just a few examples. The Pentium® processor is available from Intel Corporation, of Santa Clara, Calif.

In one embodiment, the power supply 16 provides power to all circuitry of the processor-based system 100. The circuitry may include integrated circuits on the system board 14 as well as other components connected to the system board, such as peripheral device 18. The power supply 16 may receive signals from one or more ports, directing the power supply 16 to reduce or to disable power.

The processor 12, upon receiving indication that its internal temperature has exceeded a critical threshold value, may issue a signal 20, labeled in FIG. 1 as THERMTRIP#. The processor 12 may monitor its internal temperature by reading sensors located on the chip or by some other mechanism. The processor 12 may include a pin (not shown) such that the THERMTRIP# signal 20 may be coupled to other circuitry of the system board 14.

The signal 20 may be received by a thermal trip circuit 10, according to one embodiment. The thermal trip circuit 10, upon receiving the THERMTRIP# signal 20, turns off the power supply 16. In this manner, power to the system 100 is disabled.

Figure 2:
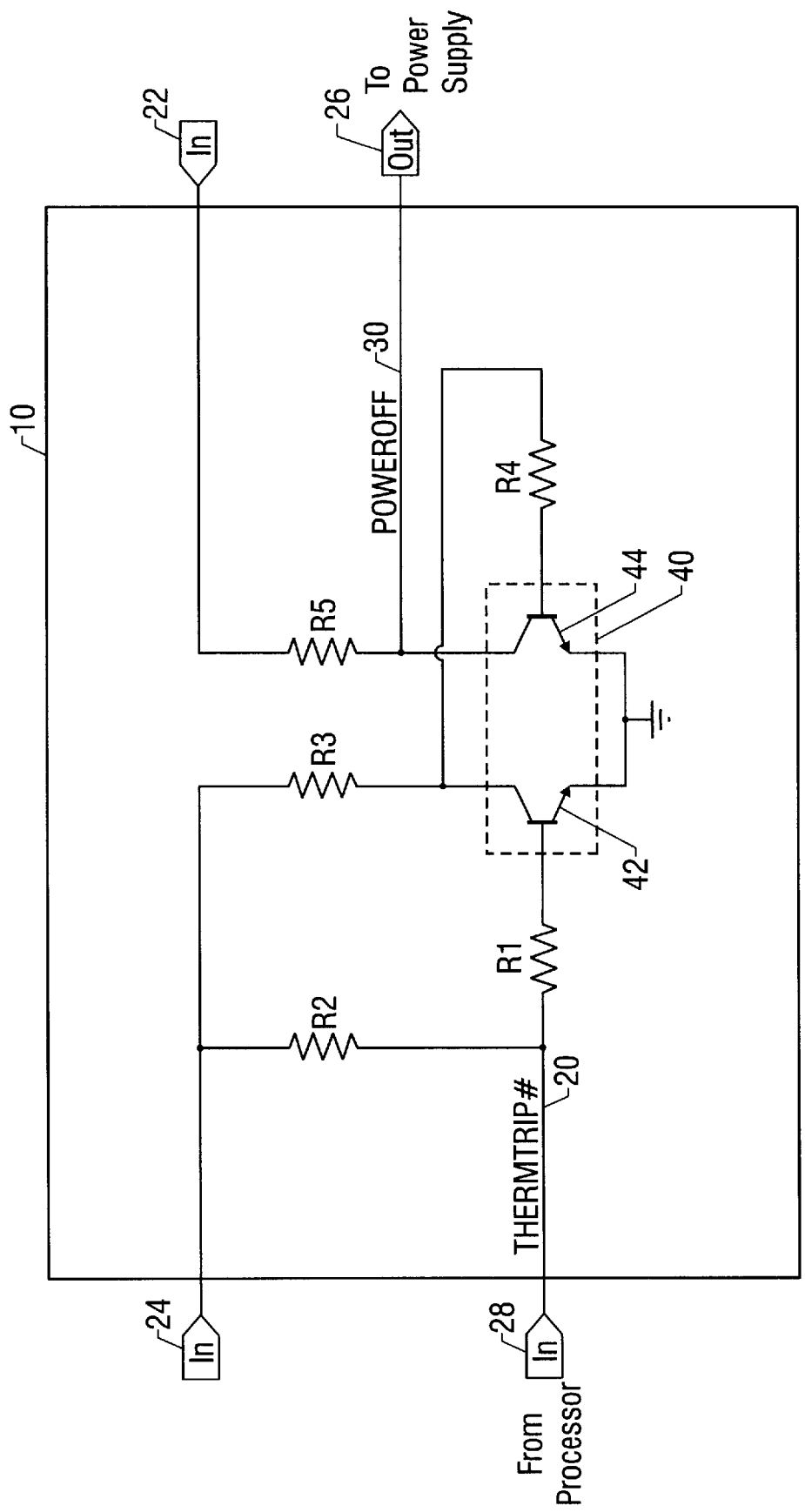
FIG. 2 is a diagram of the thermal trip circuit according to one embodiment of the invention.

In FIG. 2, the thermal trip circuit 10 of FIG. 1, according to one embodiment, includes an input port 28 from the processor 12 as well as input ports 22 and 24. The input ports 22 and 24 may supply one or more voltages to the power supply 16 from elsewhere in the system 100. These voltages may be used during power conditions such as stand-by, sleep, hibernation, or other operating conditions in which the power may be reduced or disabled. The thermal trip circuit 10 also includes an output port 26 for connection to the power supply 16.

The thermal trip circuit 10 further includes transistors 42 and 44 which comprise transistor pair 40. By coupling each transistor 42 and 44 to ground, the incoming THERMTRIP# signal 20 is inverted twice before being received by the power supply 16 as a signal 30, shown in FIG. 2 as POWEROFF. In one embodiment, an MBT3904 chip, a dual bipolar junction transistor manufactured by Phillips, may be used as the transistor pair 40. In a second embodiment, the transistors 42 and 44 are each distinct 3904 transistors. In a third embodiment, a buffer gate receives the THERMTRIP# signal 20 to produce the POWEROFF signal 30.

Further, the transistor pair 40 translates the voltage of the THERMTRIP# signal 20 before being received by the power supply 16 as the POWEROFF signal 30. In one embodiment, the voltage is translated from 2.5 v to 3.3 v. Upon receiving the POWEROFF signal 30, the power supply 16 is turned off.

In one embodiment, the processor 12 monitors its internal temperature periodically. Upon determining that its internal temperature has exceeded a predetermined threshold value, the processor 12 stops executing instructions. Following this, the processor 12 asserts the THERMTRIP# signal 20. As shown in FIG. 2, the assertion of the THERMTRIP# signal 20 causes the POWEROFF signal 30 to be received by the power supply 16, by the operation of the transistor pair 40. Accordingly, in one embodiment, the thermal trip circuit 10 of FIG. 2 provides a substantially simultaneous, automatic response to a critical temperature condition detected by the processor 12 in the system 100.

In some circumstances, a catastrophic processor condition may, in a very short time, destroy the processor 12. By responding automatically and with great speed, the chance of destroying the processor 12 may significantly be reduced by removing power. Likewise, other circuitry of the system 100 may be saved by the thermal trip circuit 10. In one embodiment, the POWEROFF signal 30 is the signal used by a power button (not shown) of the system 100 to turn the system board 40 off or on.

The thermal trip circuit thus automatically disables power to a processor-based system in response to a critical thermal condition, according to several embodiments. Where the processor indicates the critical thermal condition, the thermal trip circuit may respond substantially simultaneously by disabling the power supply. In some embodiments, degradation or destruction of the processor may be avoided.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

identifying a predetermined temperature condition within a processor;

stopping execution of instructions in the processor in response to identifying said predetermined temperature condition; and sending a signal from the processor through a circuit to a power supply that automatically shuts off the power supply to the processor in response to said predetermined temperature condition.

2. The method of claim 1, further comprising:

generating a second signal; and sending the second signal to the power supply.

3. The method of claim 2, further comprising:

inverting the signal from the processor to generate an inverted signal.

4. The method of claim 3, further comprising:

inverting the inverted signal to generate the second signal.

5. The method of claim 1, further comprising:

translating the voltage of the signal from the processor to generate a second signal.

6. A system comprising:

a processor capable of monitoring an internal thermal condition, discontinuing execution of instructions in response to the internal thermal condition, and generating a signal indicative of the internal thermal condition;

a power source to supply power to the processor; and a connection from the processor to the power source to receive a signal from the processor and automatically send the signal to the power source to disable the power source in response to the thermal condition.

7. The system of claim 6, wherein the connection sends a second signal to the power source.

8. The system of claim 7, wherein the second signal causes the power source to turn off.

9. The system of claim 8, wherein the connection translates the first signal into the second signal.

10. The system of claim 6, wherein the connection comprises a dual bipolar junction transistor.

* * * * *